United States Patent [19]
Scott

[11] 3,762,264
[45] Oct. 2, 1973

[54] TOOL HOLDER FOR PUNCHES AND THE LIKE

[75] Inventor: William B. Scott, Steward, Ill.

[73] Assignee: W. A. Whitney Corp., Rockford, Ill.

[22] Filed: Sept. 29, 1971

[21] Appl. No.: 184,685

[52] U.S. Cl........................ 83/698, 279/4, 279/89, 90/11 A
[51] Int. Cl..... B21d 37/04, B23b 31/06, B23q 3/12
[58] Field of Search............................. 279/4, 5, 89; 83/698; 90/11 A

[56] References Cited
UNITED STATES PATENTS
2,948,540  8/1960  Garberding............................ 279/4

FOREIGN PATENTS OR APPLICATIONS
1,140,795  12/1962  Germany............................ 90/11 A
1,552,346  12/1969  Germany............................ 90/11 A Primary Examiner—Francis S. Husar
Attorney—Wolfe, Hubbard, Leydig, Voit and Osann

[57] ABSTRACT

The holder includes a collar within which a punch is clamped by radially movable jaws. The jaws are shifted radially into clamping engagement with the punch by fluid-operated actuators which extend axially of the collar.

7 Claims, 6 Drawing Figures

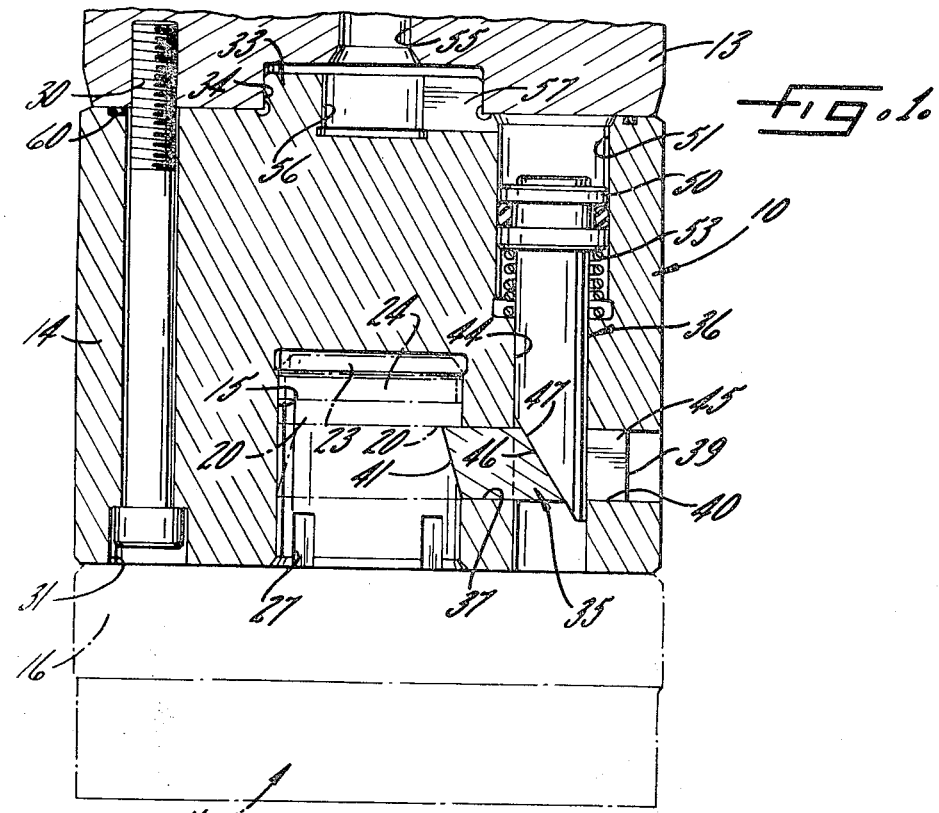
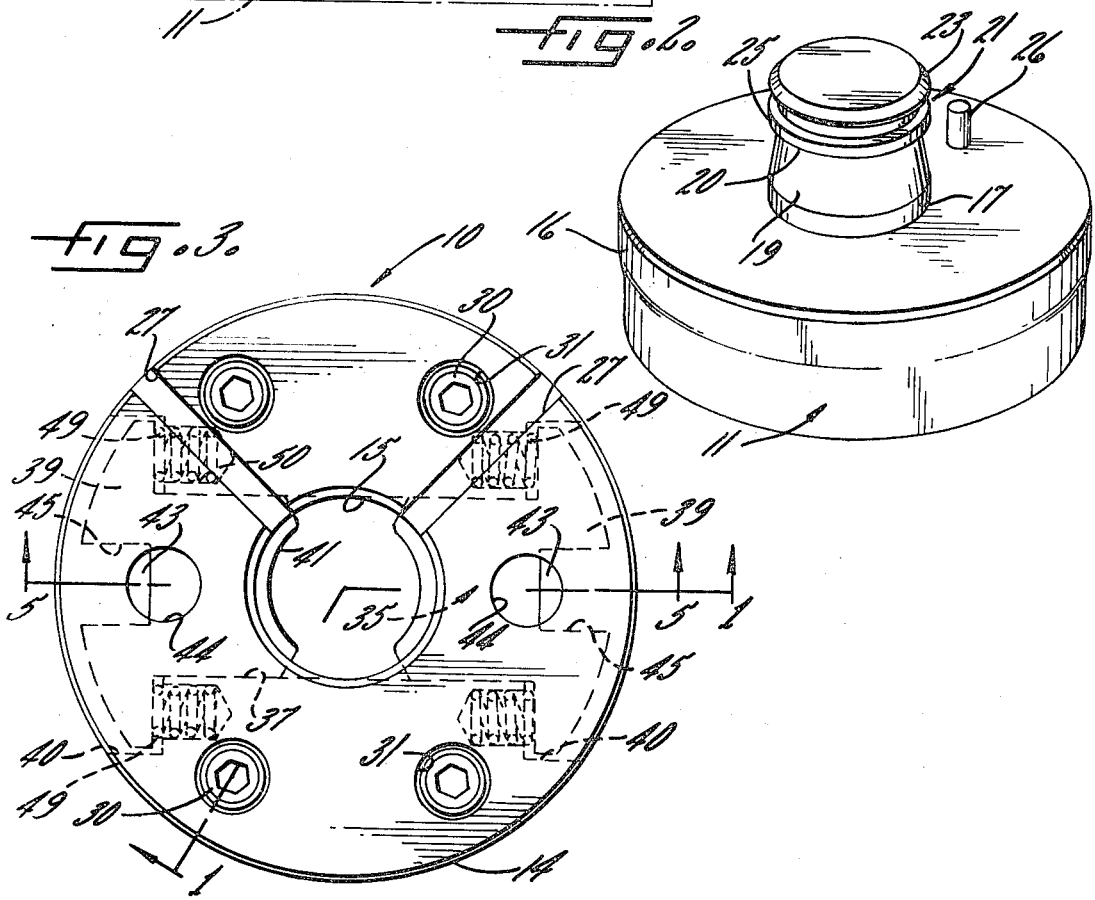

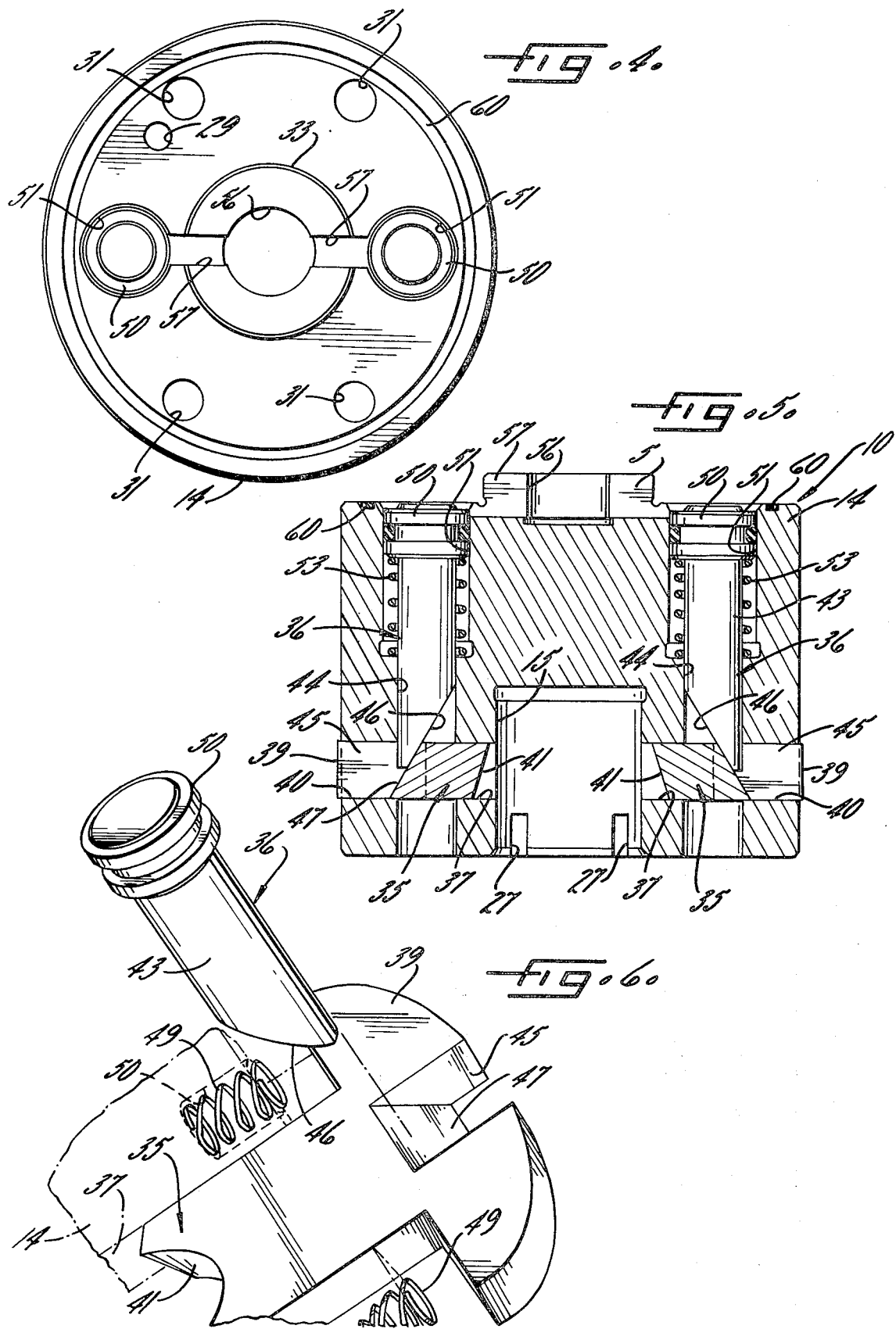

TOOL HOLDER FOR PUNCHES AND THE LIKE

BACKGROUND OF THE INVENTION

This invention relates in general to a tool holder and, more particularly, to a holder for securing a punch on the end of the reciprocable ram of a punch press.

SUMMARY OF THE INVENTION

The general aim of the present invention is to provide a new and improved tool holder which, when compared with prior holders of the same general type, is more compact in construction while effecting precise location of the tool and which, at the same time, requires the application of a smaller amount of clamping force to anchor the tool in its precise location.

In large, the foregoing is achieved through the provision of a novel tool holder with radially movable jaws which are adapted to be moved between clamped and released positions in response to the reciprocation of fluid-operated actuators extending axially of the holder, the jaws being operable when clamped to interlock with a shoulder on the tool and to prevent axial movement of the tool.

The invention also resides in the comparatively simple construction of the holder and in the unique coaction between the holder and the ram to effect the delivery of pressure fluid to the fluid-operated actuators.

These and other objects and advantages of the invention will become more apparent from the following detailed description when taken in conjunction with the accompanying drawings.

BRIEF DESCRIPTION OF THE DRAWINGS

FIG. 1 is a cross-sectional view of a new and improved tool holder embodying the novel features of the present invention and is taken substantially along the line 1—1 of FIG. 3.

FIG. 2 is a perspective view of an exemplary tool adapted to be used with the holder.

FIG. 3 is a bottom view of the holder shown in FIG. 1.

FIG. 4 is a top view of the holder shown in FIG. 1.

FIG. 5 is a cross-section taken substantially along the line 5—5 of FIG. 3 but showing the jaws of the holder in moved positions.

FIG. 6 is an exploded perspective view of certain parts of the holder.

DETAILED DESCRIPTION OF THE PREFERRED EMBODIMENT

As shown in the drawings for purposes of illustration, the invention is embodied in a holder 10 for anchoring a tool such as a punch 11 on the lower end of the reciprocable ram 13 of a punch press (not shown). The ram is mounted slidably at its upper end in a cylinder (not shown) and is adapted to reciprocate the punch downwardly and upwardly through advance and return strokes in response to the admission of pressure fluid alternately into opposite ends of the cylinder. On its advance stroke, the punch coacts with an underlying die to form a hole in an intervening workpiece, the die and the workpiece having been omitted from the drawings in order to simplify the latter.

In this instance, the punch holder 10 comprises a generally cylindrical collar 14 formed with a centrally located bore 15 extending axially of the collar and opening out of the lower end thereof so as to receive the punch 11. The punch includes an intermediate flange 16 (FIG. 2) whose upper side abuts the lower end of the collar and also includes an upper shank 17 which is telescoped into the bore 15 with only a very small amount of clearance so as to prevent radial movement of the punch. As shown in FIG. 2, the shank is tapered upwardly at 19 with the upper end of the taper being located adjacent a downwardly facing shoulder 20 defined by the lower surface of a head or so called gage lead 21 at the upper end of the shank, the gage lead enabling accurate centering of the shank in the bore. The gage lead includes a frusto-conical upper surface 23, an intermediate grooved surface 24 and a lower cylindrical surface 25 whose diameter is the same as the major diameter of the frusto-conical surface and whose lower side defines the shoulder 20 at the upper end of the taper 19. Upward movement of the punch within the collar is limited by engagement of the upper end of the gate lead with the top surface of the bore.

In order to locate the punch 11 in the proper angular position in the holder 10, an upwardly projecting pin 26 (FIG. 2) is formed on the upper side of the flange 16 and, when the shank 17 is inserted upwardly into the bore 15, the pin moves into and seats within one of a pair of complementary slots 27 (FIG. 3) formed in the lower end of the collar 14. The collar is oriented angularly relative to the ram 13 by means of a pin 29 (FIG. 4) which projects upwardly from the upper side of the collar and which fits into a hole (not shown) in the lower end of the ram. To anchor the collar to the ram, four cap screws 30 (FIGS. 1 and 3) are received within angularly spaced and axially extending holes 31 in the collar and are threaded into the end of the ram. When tightened, the cap screws draw the upper side of the collar tightly against the lower end of the ram and cause a centrally located and upwardly projecting boss 33 (FIG. 1) on the upper side of the collar to seat within a downwardly opening recess 34 in the lower end of the ram.

In accordance with the present invention, the punch 11 is anchored securely in the collar 14 by radially movable jaws 35 (FIGS. 1 and 3) which are adapted to be forced into clamping engagement with the punch by power actuators 36 extending axially of the collar. By virtue of the radially extending jaws and the axially extending actuators, the punch holder 10 is very compact in construction and, at the same time, the jaws coact with the actuators and engage the punch in such a manner that a clamping force of only relatively small magnitude need be applied to the jaws in order to securely lock the punch in the collar.

More specifically, the jaws 35 comprise a pair of diametrically opposed, flat blocks which are fitted slidably into a slot 37 (FIGS. 1 and 3) extending radially of the lower end portion of the collar 14, the slot extending across the bore 15 and being equal in width to the diameter of the bore. At its outer end, each jaw 35 is formed with an integral crosspiece 39 (FIG. 3) which is received within an enlarged opening 40 formed in the outer side of the collar at the outer end of the slot 37. The inner end of each jaw is formed with an arcuately concave clamping face 41 for engaging the taper 19 on the shank 17 of the punch 11. As shown in FIG. 1, each clamping face 41 also is inclined downwardly and outwardly at an inclination corresponding to that of the taper 19.

When the jaws 35 are forced radially inwardly to their clamped positions shown in FIG. 1, the clamping faces 41 embrace the taper 19 and the upper edges of the inner ends of the jaws lodge beneath the shoulder 20 on the punch to positively prevent the punch from being pulled downwardly out of the collar 14 when the punch is retracted out of the workpiece. The force tending to pull the punch downwardly is resisted primarily by the shear strength of the jaws and thus a clamping force of only relatively small magnitude need be applied to the jaws to hold the latter in their clamped positions and to keep the punch locked tightly in the collar.

The actuators 36 for moving the jaws 35 to and holding the jaws in their clamped positions preferably are fluid-operated and herein comprise elongated rods 43 (FIG. 1) which are mounted for up and down sliding in axially extending holes 44 leading upwardly from the lower side of the collar 14 and intersecting the outer end portions of the slot 37. The lower end portion of each rod is fitted slidably in a notch 45 (FIGS. 1 and 3) formed in the midportion of the crosspiece 39 of the respective jaw and is formed with a downwardly and outwardly inclined wedging surface 46 (FIG. 1) adapted to engage a complementary surface 47 defined by the innermost wall of the notch. When the rods 43 are shifted downwardly, engagement of the wedging surfaces 46 with the mating surfaces 47 cams the jaws radially inwardly to their clamped positions in locking engagement with the punch 11. As the rods are retracted upwardly, the jaws are returned outwardly to released positions (see FIG. 5) spaced from the shoulder 20 by coil springs 49 (FIG. 3) telescoped into holes 50 in the collar 14 and compressed between the bottoms of the holes and the end portions of the crosspieces 39 of the jaws.

In order to move the rods 43 upwardly and downwardly, each rod is connected at its upper end to a piston 50 (FIG. 1) which is slidable upwardly and downwardly in a cylinder 51 defined by an axially extending hole formed in the collar 14 and opening out of the upper side thereof. When pressurized air is admitted into the upper ends of the cylinders, the rods are forced downwardly to shift the jaws 35 radially inwardly to their clamped positions. When the air is dumped from the cylinders, the rods are retracted upwardly by coil springs 53 telescoped over the rods and compressed between the pistons and the bottoms of the cylinders. It will be appreciated that the springs 53 could be omitted and that the rods could be retracted by introducing pressurized air into the lower ends of the cylinders.

Advantageously, pressurized air for actuating the rods 43 is introduced into the cylinders 51 by way of the ram 13. As shown in FIG. 1, an axial passage 55 extending along the center of the ram opens out of the lower end of the ram and communicates at its lower end with a hole 56 in the center of the boss 33. At its upper end, the passage 55 communicates with a source of pressurized air through a suitable valve (not shown). Air is delivered from the passage 55 to the upper ends of the cylinders through radially extending slots 57 formed in the boss 33, the slots opening out of the upper side of the boss and leading from the hole 56 to the upper ends of the cylinders. Thus, pressurized air delivered into the ram 13 through the passage 55 is admitted into the upper ends of the cylinders 51 through the hole 56 and the slots 57. The upper ends of the cylinders 51 and the upper sides of the slots 57 are closed off by the lower end of the ram and, to prevent air from escaping outwardly of the collar 14, an O-ring 60 (FIG. 1) is seated in the upper side of the collar and seals the latter to the ram.

From the foregoing, it will be apparent that the present invention brings to the art a new and improved punch holder 10 of relatively simple construction. The radially movable jaws 35 in conjunction with the axially extending actuators 36 provide for compactness while serving to locate the punch securely and accurately.

I claim as my invention:

1. The combination of a vertically reciprocable ram and a holder for a punch, said holder comprising an upright collar secured at its upper end to the lower end of said ram and having an axially extending bore opening out of its lower end for receiving said punch, angularly spaced jaws projecting into said bore and mounted for in and out radial sliding between clamped positions engaging said punch and released positions spaced outwardly from said punch, springs mounted in said collar and urging said jaws outwardly toward said released positions, angularly spaced cylinders extending axially of said collar and spaced radially outwardly of said bore, fluid-operated actuators guided in said cylinders for axial reciprocation and operable when reciprocated to cause movement of said jaws between said positions, said cylinders having open upper ends opening upwardly out of the upper end of said collar and closed off by the lower end of said ram, a passage extending axially within said ram and communicating with a pressure source for delivering pressure fluid into the passage, and angularly spaced slots extending generally radially across the upper end of said collar and communicating between said passage and the upper ends of said cylinders to deliver pressure fluid into the cylinders, said slots opening upwardly out of the upper end of said collar and having their upper sides closed off by the lower end of said ram.

2. The combination defined in claim 1 in which said actuators comprise rods guided in said collar for axial reciprocation and engageable with said jaws, and pistons connected to said rods and slidably received within said cylinders.

3. A holder for a tool, said holder comprising a collar having an axially extending bore opening out of one of its ends for receiving said tool a slot extending radially through said collar and communicating with said bore, angularly spaced and generally T-shaped jaws mounted in said slot for in and out radial sliding between clamped positions in engagement with said tool and released positions spaced outwardly from said tool, crosspieces formed on the outer ends of said jaws and received in the end portions of the slot, springs mounted in said collar and urging said jaws outwardly toward said released positions, there being two springs associated with each jaw with each pair of springs being compressed between said collar and the end portions of the respective crosspiece, reversible actuators guided in said collar for axial reciprocation and operable when moved axially in one direction to shift said jaws radially inwardly to said clamped positions, there being a notch formed in the midportion of each crosspiece between said springs and receiving the respective actuator, the outwardly facing surface of each notch defining an inclined wedge surface, and mating surfaces on said actuators and engageable with said wedge surfaces to cam said jaws inwardly when said actuators are moved to shift said jaws to said clamped positions.

4. The combination defined in claim 2 in which inclined wedge surfaces are formed on the outer ends of said jaws, and mating surfaces formed on the free ends of said rods and engageable with said wedge surfaces to cam said jaws inwardly when said rods are moved to shift said jaws to said clamped positions.

5. The combination defined in claim 1 in which said collar is formed with a radially extending slot slidably receiving said jaws, crosspieces formed on the outer ends of said jaws and received in end portions of the last-mentioned slot, there being two springs associated with each jaw with each pair of springs being compressed between said collar and the end portions of the respective crosspiece.

6. The combination defined in claim 5 in which a notch is formed in the midportion of each crosspiece and receives the respective actuator, the outwardly facing surface of each notch defining an inclined wedge surface, and mating surfaces on said actuators and engageable with said wedge surfaces to cam said jaws inwardly when said actuators are moved to shift said jaws to said clamped positions.

7. The combination defined in claim 1 in which said jaws are formed with arcuate clamping faces which are inclined downwardly and outwardly.

\* \* \* \* \*